Aug. 7, 1923.
A. G. BUTLER
ROOF FLASHING
Filed Aug. 24, 1922
1,464,406
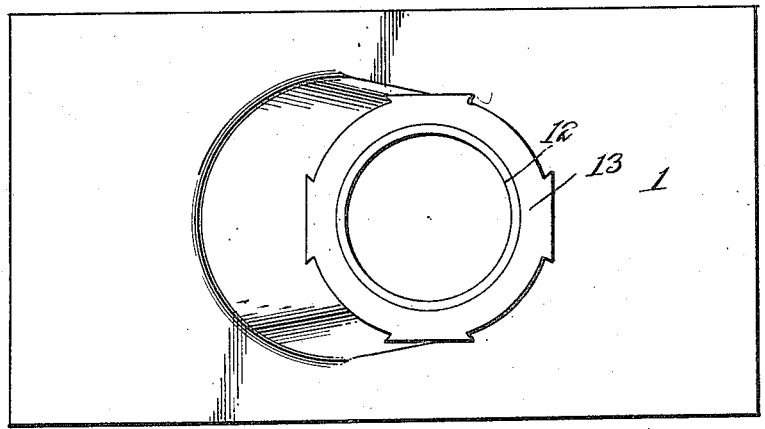
Fig. 1.
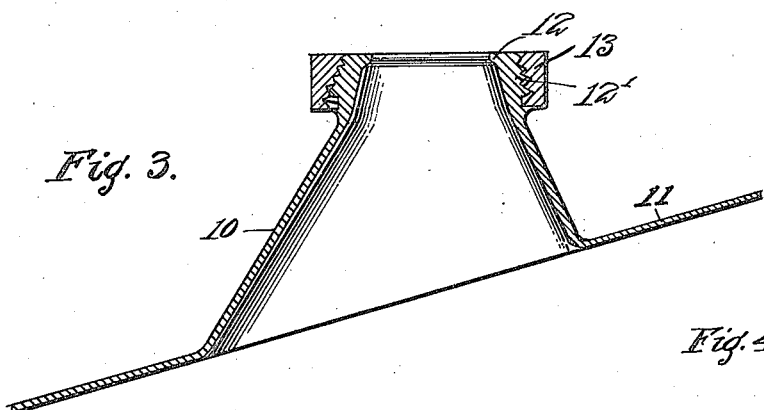
Fig. 3.
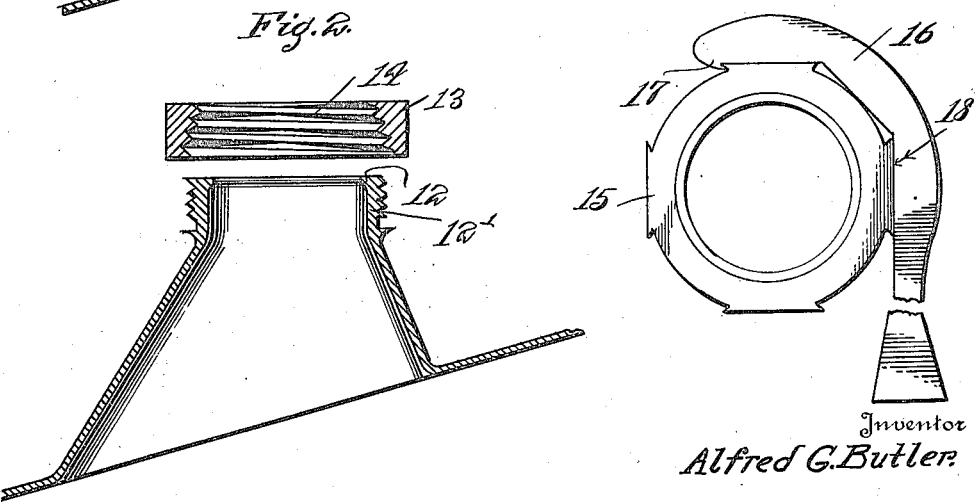
Fig. 2.
Fig. 4
Inventor
Alfred G. Butler.
WITNESSES
By Richard B. Owen
Attorney Patented Aug. 7, 1923.

1,464,406

UNITED STATES PATENT OFFICE.

ALFRED G. BUTLER, OF VALLEYFORD, WASHINGTON.

ROOF FLASHING.

Application filed August 24, 1922. Serial No. 584,120.

*To all whom it may concern:*

Be it known that I, ALFRED G. BUTLER, a citizen of the United States, residing at Valleyford, in the county of Spokane and State of Washington, have invented certain new and useful Improvements in Roof Flashings, of which the following is a specification.

This invention relates to a roof collar or flashing and has special reference to a flashing for pipes.

One important object of the invention is to improve the general construction of devices of this character.

A second important object of the invention is to provide an improved device of this character so arranged that the simple operation of screwing a nut on the device after the pipe is in position, will effect complete sealing of the space around the pipe.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:—

Figure 1 is a perspective view of the improved flashing.

Figure 2 is a section through the flashing and nut, in position before the nut is screwed down on the body of the flashing.

Figure 3 is a view similar to the Figure 2 but showing the parts in the position assumed with the nut screwed fully down.

Figure 4 is a detail showing a form of wrench adapted for use with this nut.

In carrying out the objects of the invention there is provided the roof collar or flashing consisting of a substantial frusto-conical portion 10 having a flange 11 extending around its major end and being provided at its minor end with a thickened portion 12 threaded as at 12'. It will be observed that the threads on this thickened portion are, prior to screwing down the nut, of the general type of bolt threads. That is to say, the threads are of uniform root diameter throughout. The parts just mentioned are all formed integrally and are preferably formed of some plastic metal such as lead, copper, or a suitable alloy capable of ready flow when cold. In connection with these parts, there is used a nut 13 having its opening tapered and provided with screw threads 14, the nut threads thus being substantially pipe threads. The nut is provided at intervals of its periphery with undercut projection 15 for engagement by a wrench 16 having a hook end 17 adapted to engage one of the undercut portions, and also having a flat portion 18 engageable against the flat side of an adjacent projection.

In operation this collar is slipped over the pipe and the flange 11 is secured on the roof in the usual manner. The nut 13 is then screwed down on the threads 12' and, because this nut is for all practical purposes inexpansible the thickened portion 12 is forced inward against the pipe and squeezed solidly into contact therewith so that a water tight joint is mechanically formed between such pipes and roof collar.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention what is claimed as new, is:—

1. In combination a roof collar having a body portion formed of plastic metal and provided with threads at one end, and a nut having a threaded and tapered opening engaging on the threaded end of the collar body to contract the same as the nut is screwed on said end.

2. In a device of the kind described, a roof collar having a frusto conical body portion provided at its major end with a roof engaging flange and having its minor end thickened and threaded exteriorly, the threads of the minor end being substantially bolt threads, said collar being formed throughout of plastic metal and an inexpansible nut having a tapered and threaded opening and adapted to fit on the threads of the collar to compress and contract the thickened portion thereof.

In testimony whereof I affix my signature in presence of two witnesses.

ALFRED G. BUTLER.

Witnesses:
C. H. TART,
NETTIE HERRMAN.